Jan. 15, 1929. Re. 17,193

W. R. DAY

PISTON

Original Filed Dec. 13, 1924

INVENTOR.
William R. Day,
BY
Frank M. Slough.
ATTORNEY.

Reissued Jan. 15, 1929. Re. 17,193

UNITED STATES PATENT OFFICE.

WILLIAM R. DAY, OF CLEVELAND, OHIO.

PISTON.

Original No. 1,568,547, dated January 5, 1926, Serial No. 755,609, filed December 13, 1924. Application for reissue filed June 7, 1926. Serial No. 114,347.

My invention relates to the construction of pistons.

One of the objects of my invention is a light weight piston.

Another object is to reduce distortion of the bearing portion of pistons.

Another object is a piston which wears the wall of a cylinder evenly.

Another object is to reduce the scoring of the cylinder wall.

Another object is to considerably reduce piston slap.

Another object is to prolong the life of pistons as well as of cylinders in which the pistons operate.

Another object is a piston of low cost of production.

It is well known in the art that a piston should be as light in weight as possible and should create as little friction as possible when it operates in a cylinder.

It is also well known in the art that certain portions of the usual pistons wear much faster than other portions, indicating thereby that too much friction is created by these fast wearing portions.

To reduce, or at least mitigate, this friction, the piston shell or skirt has, previously, been relieved or slit but such expediences not only reduce the area of the bearing surface of the piston but also add materially to the cost of production of the piston.

When these portions are relieved, the bearing surface of the piston is unequally distributed, thereby causing the cylinder wall to wear uneven and out of round and quite frequently score the cylinder because foreign matter can readily and easily wedge onto the bearing surface from these relieved portions; all of which causes a leaky piston and other disadvantages in a short time.

After experimentation, I have found that in the prior construction with which I am familiar, the action of the rod, particularly connecting rod or pitman, exerts an unequal pressure on the piston through the piston-pin bosses and that the shell of the piston, as previously made, is thereby distorted to such an extent that some portions of this shell or skirt are forced against the cylinder wall with greater pressure than are other portions, thereby causing the trouble mentioned.

Upon further experimentation, I have found that in my improved construction, the shell of a piston is substantially undistorted when the boss or bosses, by means of which the piston is connected to the rod, is substantially freed from the skirt of the piston.

Therefore, by eliminating, as far as possible, distorting connection of the boss and the shell, I reduce the distortion of the shell as well as the cost of correction of these distortions, thereby producing a better piston at less cost than heretofore.

One structure for attaining my objects and embodying the features of my invention is illustrated in the accompanying drawing in which.

Similar reference characters refer to similar parts throughout the views.

Figure 1:
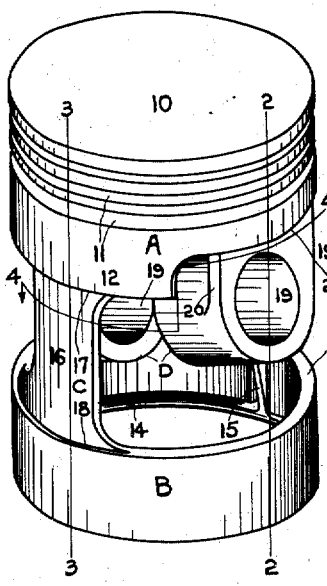
Fig. 1 is a perspective view of a piston embodying my invention and showing the general appearance of the piston as a whole.
Figure 2:
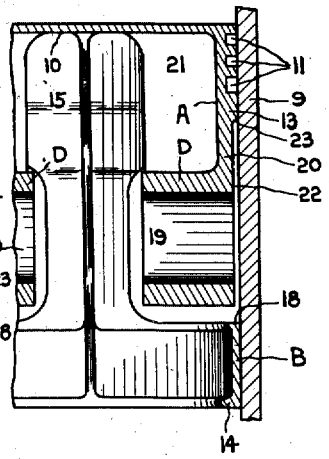
Fig. 2 is a partial section, taken on a vertical plane indicated by the line 2—2 in Fig. 1, showing clearly the relation of the piston-pin bosses to the shell of the piston and to the wall of the cylinder.
Figure 3:
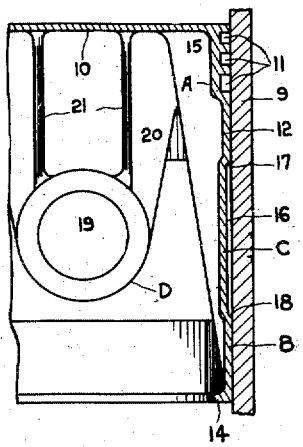
Fig. 3 is a partial section, taken on a vertical plane indicated by the line 3—3 in Fig. 1, showing clearly the relation of the connecting portion and the bearing portions of the shell.
Figure 4:
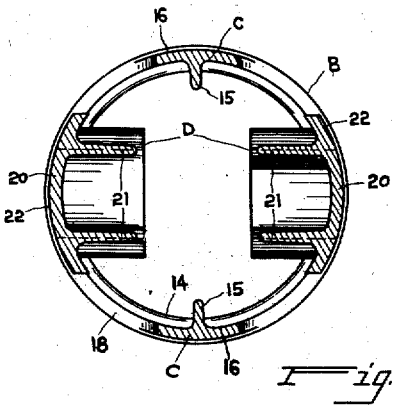
Fig. 4 is a section, taken on a horizontal plane indicated by the line 4—4 in Fig. 1, showing the horizontal relation between the piston portions.

The piston shown in the accompanying drawing is composed, principally, of the upper bearing portion A, the lower bearing portion B, the connecting portions C, and the bosses D.

The upper bearing portion A fits the wall 9 of the cylinder all around and is closed at the top of the head wall 10 and is preferably provided with the grooves 11 for piston rings as usual in pistons.

The usual practice relative to maintaining contact between the head or upper bearing portion and the cylinder walls entirely through such rings is also herein preferably contemplated. This will require that the lateral surfaces of the upper bearing portion be slightly relieved from the cylinder walls, although this may only amount to a very slight clearance.

The circumferential wall of the portion A preferably has the wider portions 12 above the portions C and the narrower portions 13 above the bosses D.

The lower bearing portion B also preferably is annular, and continuous, being preferably unslitted and is made sufficiently rigid that it will resist any lateral components of thrust to which the lower bearing portion will be subjected in use when the piston is reciprocated within the walls of a cylinder with the lower bearing portion in good bearing contact with such cylinder wall. The lower bearing portion therefore at all times fits the wall 9 all around and is provided with the circumferential rib 14 on the bottom, whereas the outer surfaces of the bosses and skirt extension connecting portions C are relieved from the wall.

Each of the connecting portions C extends part way around the piston circumferentially and is disposed between the portions A and B longitudinally and merges into both of them and connects them to each other. The longitudinal ribs 15 are provided to stiffen the portions C as well as the piston as a whole.

It is observed that the outer circumferential surface 16 of each portion C is disposed below the outer circumferential surface of the portions A and B and that the shoulders 17 and 18 are abrupt; the purpose thereof will appear presently.

Each of the bosses D has the bore 19 for a piston-pin or for a bushing therefor. Each of the bosses D is supported on the head 10 of the portion A and is free of any connection with the portion B.

Each of the bosses D is connected to the portion A by the rib head portion 20 extending upward, merging into the portion 13, by the two radial ribs 21 merging into the head wall 10, thereby providing a substantial support for each of the bosses D without connecting them to the portion B and carrying the main point of such support up to the wall 10, so that most of the unequal stresses brougth on the bosses D are transmitted to this wall 10 and to the stiffer wall of the portion A without materially affecting either of the portions A and B.

I prefer to use the two radial ribs 21 as shown to more effectively counteract the distortive action on the bosses D and to transmit as much as possible of the stress caused by the action of the connecting rod on the bosses directly to the top wall 10 of the piston. This two rib arrangement also stiffens the portion 20 and thereby prevents this distortive effect from being transmitted to the bearing portions of the piston.

It is observed that the outer circumferential surface 22 of the portion 20 is relieved relative to the outer circumferential surface of the bearing portions A and B and that the shoulder 23 is preferably abrupt similar to the shoulders 18 and 17 previously described.

These abrupt shoulders on the portion A have a tendency to scrape the surplus lubricant off of the wall of the cylinder on the down stroke of the piston. A certain quantity of this scraped off lubricant adheres to these shoulders during this down stroke and is deposited again on the cylinder wall on the upstroke. Some of this scraped off lubricant also travels downward on the portion 20 and finds its way onto the piston-pin and thereby helps to lubricate the same. Some of this scraped off lubricant also travels downward on the portions C and thereby helps to lubricate the portion B. When too much lubricant is splashed or otherwise put on the cylinder wall, the shoulders 23 and 17 scrape it off on the downstroke while the shoulders 18 scrape it off on the up stroke. In either case of such scraping off, the surplus lubricant finds its way into the interior of the piston and drips off into the crank case or elsewhere.

The above shoulder arrangement prevents excessive lubricant from entering the cylinder above the piston, and thereby economizes in lubricant consumption as well as aiding in the efficiency of the power development of the engine, and at the same time adequately lubricate the cylinder wall.

These abrupt shoulders also effectively scrape all foreign substances from the cylinder wall, similar to the scraping process just described, thereby preventing the scoring of the cylinder.

The manner of supporting the bosses D on the piston, as set forth, prevents the connecting rod, or other rod, acting on these bosses from distorting the bearing portions of the piston and therefore, such a piston requires no expensive relieving or other undesirable expedients, and the surfaces 16 and 22 require no machining.

In the elimination of undesirable relieving and machining, augmented by the light weight structure possible with my invention, and further augmented by the saving in lubricant and by increased power, I provide a piston which is very economical of production and very efficient in operation and in action.

By avoiding any connection between the wrist pin bosses and the skirt, making connection only between the skirt and the head by means of skirt extensions spaced from the bosses, very little distortion effect is transmitted from the head and bosses to the skirt.

It will be seen from the above that I have provided a piston wherein the wrist-pin supporting bosses are supported from the head independently of the supports C for the skirt and that the skirt B is continuous, being non-slitted and thereby relatively non-compressible when thrust laterally against the cylinder walls, and that this relatively rigid bearing portion B forms a non-distortable guide for the head A. The head A, with the piston rings, which in the usual manner are fitted within the grooves 11 of the head, effects all of the bearing contact had with the cylinder walls.

It will be understood that in the claims wherein I specify a "relatively rigid skirt", this term is to be taken to mean that a skirt is provided which is either in the form of an annulus or otherwise so made that it will not yield resiliently when subjected to the lateral components of thrust imparted to it during reciprocation of the piston in the cylinder walls. My invention is therefore distinguishable from those constructions wherein such thrusts are permitted to effect yielding of portions of the skirt, thereby destroying to a considerable degree the function of the skirt as a guiding element for the head to prevent any undue inclination of the head relative to the cylinder axis.

I am aware that modifications may be made in the structure of the piston as well as in the arrangement of the elements thereof; therefore, without limiting myself to the precise construction and arrangements shown and described.

I claim:

1. A piston comprising an upper bearing portion closed by a top wall, a lower bearing portion, connecting portions between said upper and said lower bearing portions, piston-pin bosses disposed intermediate of said connecting portions and free from said lower bearing portion, rib means connecting each of said bosses to said upper bearing portion, and the outer surfaces of said connecting portions being inwardly disposed relatively to the outer surface of said bearing portions, and defined by shoulders to lubricate the wall of the cylinder in which the piston operates without permitting excessive lubricant to enter this cylinder above the piston.

2. A piston comprising an upper bearing portion closed by a top wall, a lower bearing portion, connecting portions between said upper and said lower bearing portions, piston-pin bosses disposed intermediate of said connecting portions and free from said lower portion, said upper bearing portion wider above said connecting portions than above said piston bosses to compensate for angular pressure on the piston, rib means connecting each of said bosses to said upper bearing portion, and the outer surface of said connecting portions being inwardly disposed relatively to below the outer surface of said bearing portions, and defined by shoulders to lubricate the wall of the cylinder in which the piston operates without permitting excessive lubricant to enter the cylinder above the piston.

In testimony whereof, I hereunto affix my signature this 15th day of June, 1926.

WILLIAM R. DAY.